UNITED STATES PATENT OFFICE.

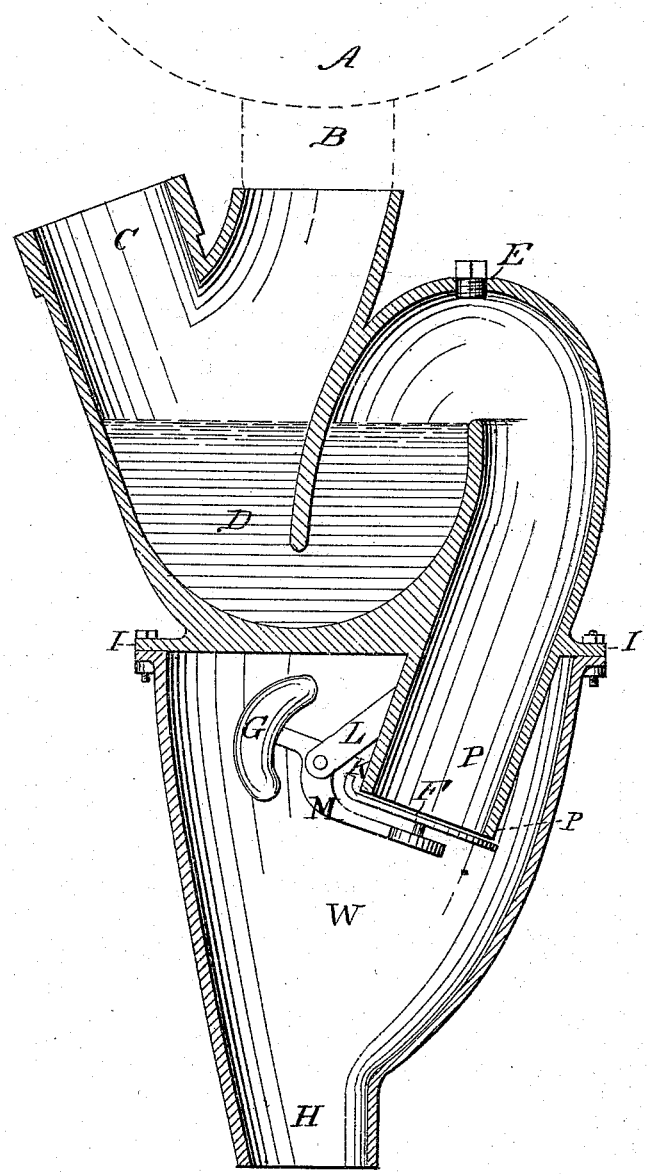

JOHN PETER SCHMITZ, OF SAN FRANCISCO, CALIFORNIA.

IMPROVEMENT IN STENCH-TRAPS.

Specification forming part of Letters Patent No. 182,231, dated September 12, 1876; application filed July 20, 1876.

*To all whom it may concern:*

Be it known that I, JOHN PETER SCHMITZ, of the city and county of San Francisco and State of California, have invented a new and Improved Stench-Trap; and I do hereby declare that the following is a full, clear, and exact description of the same, reference being had to the accompanying drawing, forming part of this specification, in which the figure is a vertical section.

My invention relates to an improved construction of stench-trap, designed more particularly for wash-basins and sinks, but applicable, also, to general use. It consists, mainly, in combining, with the ordinary water-trap, a subjacent flap-trap or weighted valve, which remains closed until its weight is overbalanced by the greater weight of water, when it opens automatically and allows the water to escape, by means of which arrangement the bubbling up of sewer-gas through the water-trap is prevented, by relieving the water-trap from the pressure of the same.

In the drawing, A represents, in dotted lines, the bottom of a wash-basin or sink; B, a pipe, connecting the basin with the trap; C, the connection for the overflow-pipe, running from the basin to the trap; D, an ordinary S-shaped trap, filled with water, to prevent foul air from passing up to the basin; E, an opening in the upper bend of the S-shaped trap, closed by a screw-head, and intended to facilitate the cleansing of the trap from obstructions which may lodge therein; F, a cover or flap-trap, for the bottom end P of the water-trap, which cover is hinged to lugs L, and is balanced and closed by weight G, until forced open by the weight of the water passing through the water-trap. This flap-trap and water-trap together constitute a double-acting trap. H is the connection for the leading-off or waste pipe; I, the base of the upper trap forming a connection for the lower trap-case W.

The flap or cover F and tube-edge P are made to fit nicely without any elastic lining, for rendering the same water-tight, none being required, for the reason that the S-trap, immediately above, breaks the force of water passing through, and thereby allows the slimy and greasy substance (which naturally forms in a few days in traps and sewer-pipes) to remain permanent at the inner edge of the trap-tube and cover, thereby forming a tight packing for the joint when closed, which retains water above it until the weight is overbalanced, and prevents the back pressure of sewer-gas from forcing the water up in the trap and bubbling through the same.

The solid edge of the trap-tube P slopes from the hinge or back part to the front. The flap-cover F in this trap is loose, but does not revolve. It has at its back part the upward-bent and curved flange K, which prevents pieces of twine, thread, or hair, which pass into traps sometimes, from becoming entangled at the balancing-beam or hinge.

This flange is of importance, as the lodgment of the substances just mentioned would prevent the trap from closing properly, and thereby defeat its uses.

The lower case W incloses the flap-trap, and forms a joint with the edge of the base I of the S-shaped trap, thereby forming a tight and continuous inclosure from above the water-trap down to the waste-pipe.

It will be seen that my invention is a great improvement upon the ordinary S-shaped water-traps, for the reason that those already in use were not reliable as an effectual bar to the sewer-gas, for when this gas or foul air had accumulated in the waste-pipe, the water in the trap does not possess sufficient weight to resist the back pressure of the gas, and the latter would bubble up through the water.

This difficulty, it will be seen, is obviated by my improved double-acting trap in a simple, effective, and automatic manner.

Having thus described my invention, what I claim as new is—

1. The S-trap having an opening, E, base I, sloping tube P, and lug L, as and for the purpose described.

2. The combination, with the sloping tube

P, having lugs L, of the weighted lever M, carrying the loosely-attached cover F, having flange K, substantially as and for the purpose described.

3. The casing W, in combination with the flap-trap, and the S-trap, having a base I, for the purpose described.

4. The combination of the flap-trap and S-trap, as and for the purpose described.

JOHN PETER SCHMITZ.

Witnesses:
JACOB MUELLER,
OSCAR HAGOPIHL.